US011935027B2

(12) United States Patent
Ramamurthy

(10) Patent No.: US 11,935,027 B2
(45) Date of Patent: Mar. 19, 2024

(54) SYSTEM, METHOD, AND COMPUTER PROGRAM PRODUCT FOR AUTHENTICATION BY AUGMENTED REALITY FOR FRAUD PREVENTION

(71) Applicant: Visa International Service Association, San Francisco, CA (US)

(72) Inventor: Rakesh Ramamurthy, Katriguppe (IN)

(73) Assignee: Visa International Service Association, San Francisco, CA (US)

( * ) Notice: Subject to any disclaimer, the term of this patent is extended or adjusted under 35 U.S.C. 154(b) by 162 days.

(21) Appl. No.: 17/548,919

(22) Filed: Dec. 13, 2021

(65) Prior Publication Data

US 2022/0101295 A1     Mar. 31, 2022

Related U.S. Application Data

(63) Continuation of application No. 16/289,806, filed on Mar. 1, 2019, now Pat. No. 11,263,615.

(51) Int. Cl.
*G06Q 20/20* (2012.01)
*G06F 21/31* (2013.01)
(Continued)

(52) U.S. Cl.
CPC ........... *G06Q 20/206* (2013.01); *G06F 21/31* (2013.01); *G06Q 20/20* (2013.01); *G06Q 20/382* (2013.01);
(Continued)

(58) Field of Classification Search
None
See application file for complete search history.

(56) References Cited

U.S. PATENT DOCUMENTS 8,364,552 B2   1/2013  Ciurea
8,429,004 B2 *  4/2013  Hamilton ............... G06Q 10/06
                                                705/7.41
(Continued)

FOREIGN PATENT DOCUMENTS

WO     2013120163 A2    8/2013

OTHER PUBLICATIONS

Cruz et al., "An augmented reality application for improving shopping experience in large retail stores", Virtual Reality, 2018, 11 pages.

(Continued)

*Primary Examiner* — Jacob C. Coppola
(74) *Attorney, Agent, or Firm* — The Webb Law Firm

(57) ABSTRACT

Described are a system, method, and computer program product for authentication by augmented reality (AR) for fraud prevention. The method includes receiving AR map data of an authorized area of operation associated with a merchant. The AR map data is generated from an AR recording device and includes one or more environmental anchors and one or more virtual object reference points. The method also includes storing the AR map data in association with a merchant identifier and receiving a request for authentication of an operation by a merchant point-of-sale (POS) device. The method further includes communicating at least a portion of the AR map data to the merchant POS device for execution of an AR re-localization process, and, in response to success of the re-localization process by the merchant POS device, authenticating the operation.

20 Claims, 4 Drawing Sheets

(51) Int. Cl.
    *G06Q 20/38*     (2012.01)
    *G06Q 20/40*     (2012.01)
    *G06T 19/00*     (2011.01)

(52) U.S. Cl.
    CPC ....... *G06Q 20/401* (2013.01); *G06Q 20/4016* (2013.01); *G06T 19/006* (2013.01)

(56) References Cited

U.S. PATENT DOCUMENTS

| | | | |
|---|---|---|---|
| 9,996,829 | B1 | 6/2018 | Baig et al. |
| 10,055,569 | B2 | 8/2018 | Maresh et al. |
| 10,134,084 | B1 | 11/2018 | Gabriele et al. |
| 10,157,504 | B1 | 12/2018 | Jain |
| 10,482,664 | B1 | 11/2019 | Schlosser et al. |
| 10,540,550 | B2 | 1/2020 | Miller et al. |
| 10,789,353 | B1 | 9/2020 | Taylor et al. |
| 11,521,208 | B2 * | 12/2022 | Pham ..................... G06V 40/50 |
| 2011/0137804 | A1 | 6/2011 | Peterson |
| 2014/0040051 | A1 | 2/2014 | Ovick et al. |
| 2014/0195664 | A1 | 7/2014 | Rahnama |
| 2014/0302915 | A1 | 10/2014 | Lyons et al. |
| 2014/0337232 | A1 | 11/2014 | Glasgo |
| 2016/0140553 | A1 | 5/2016 | Faith et al. |
| 2016/0179830 | A1 | 6/2016 | Schmalstieg et al. |
| 2016/0260256 | A1 | 9/2016 | Shefi |
| 2018/0211137 | A1 | 7/2018 | Hesch et al. |
| 2018/0213359 | A1 | 7/2018 | Reinhardt et al. |
| 2018/0247370 | A1 | 8/2018 | Nickerson et al. |
| 2018/0285549 | A1 | 10/2018 | Sonkar et al. |
| 2018/0293570 | A1 | 10/2018 | Pareek et al. |
| 2018/0373858 | A1 | 12/2018 | Farkash et al. |
| 2019/0149725 | A1 | 5/2019 | Adato et al. |
| 2019/0340631 | A1 | 11/2019 | Seshadri |
| 2019/0392220 | A1 | 12/2019 | Maan et al. |
| 2020/0019970 | A1 * | 1/2020 | Pham .................. G06Q 20/3224 |
| 2020/0160345 | A1 * | 5/2020 | Damania ................ G06V 40/70 |
| 2020/0279244 | A1 | 9/2020 | Matta |

OTHER PUBLICATIONS

Martin et al., "Decoupled Mapping and Localization for Augmented Reality on a Mobile Phone", IEEE Virtual Reality, Mar. 2014, Minneapolis, Minnesota, 2014, 3 pages.

* cited by examiner

SYSTEM, METHOD, AND COMPUTER PROGRAM PRODUCT FOR AUTHENTICATION BY AUGMENTED REALITY FOR FRAUD PREVENTION

CROSS REFERENCE TO RELATED APPLICATION

This application is a continuation of U.S. patent application Ser. No. 16/289,806, filed Mar. 1, 2019, titled "System, Method, and Computer Program Product for Authentication by Augmented Reality for Fraud Prevention," the disclosure of which is hereby incorporated by reference in its entirety.

BACKGROUND

1. Technical Field

Disclosed embodiments or aspects relate generally to computer authentication and fraud prevention, and, in one particular embodiment or aspect, to a system, method, and computer program product for authentication by augmented reality for fraud prevention.

2. Technical Considerations

Many merchants make use of advanced point-of-sale (POS) devices, such as mobile POS devices, to facilitate consumer transactions in a merchant store. Mobile POS devices, by not being physically anchored to a checkout counter, may be used at several different locations in a merchant store. However, because not all POS devices are anchored, there is the possibility for consumer fraud by theft and use of the POS device outside of a merchant store. Moreover, consumers may attempt to spoof a POS device from a remote location to engage in transactions, as if they were being completed by merchant personnel in a merchant store.

Additionally, merchants may desire to partition a merchant store, or area associated with the store, into one or more transaction zones, wherein the functionality of a mobile POS device depends on (e.g., is limited, prohibited, etc.) the location in the merchant store. For example, a merchant may want one portion of the store to be associated with one type of transaction, and another portion of the store to be associated with another type of transaction. To illustrate, a market or food co-op may wish to restrict purchases of alcohol to a dining area, while allowing grocery purchases throughout the store. A merchant may also wish to prohibit all transactions in some zones or areas inside or outside of a store. Some traditional location and positioning methods (e.g., GPS, cellular triangulation, etc.) may be unsuitable for this purpose, given potential inaccuracy inside buildings and lack of precision to assign strict boundary zones.

Therefore, there is a need in the art for a technical solution to prevent fraudulent activity on POS devices, and also to provide merchants the ability to authenticate transactions and specify the functionality of POS devices within a store.

SUMMARY

Accordingly, and generally, provided is an improved system, method, and computer program product for authentication by augmented reality (AR) for fraud prevention. Preferably, provided is a system, method, and computer program product for receiving AR map data of an authorized area of operation associated with a merchant and storing the AR map data in association with a merchant identifier. Preferably, provided is a system, method, and computer program product for receiving a request for authentication of an operation by a merchant point-of-sale (POS) device. Preferably, provided is a system, method, and computer program product for communicating at least a portion of the AR map data to the merchant POS device for execution of an AR re-localization process, and, in response to success of the re-localization process by the merchant POS device, authenticating the operation.

According to non-limiting embodiments or aspects, provided is a computer-implemented method for authentication by augmented reality (AR) for fraud prevention. The method includes receiving, with at least one processor, AR map data of an authorized area of operation associated with a merchant. The AR map data is generated from at least one AR recording device and includes at least one environmental anchor and at least one virtual object reference point. The method also includes storing, with at least one processor, the AR map data in association with a merchant identifier. The method further includes receiving, with at least one processor, a request for authentication of at least one operation by at least one merchant point-of-sale (POS) device, the request including the merchant identifier. The method further includes communicating, with at least one processor, at least a portion of the AR map data to the at least one merchant POS device for execution of an AR re-localization process. The method further includes, in response to failure of the re-localization process by the at least one merchant POS device, denying, with at least one processor, authentication of the at least one operation. The method further includes, in response to success of the re-localization process by the at least one merchant POS device, authenticating, with at least one processor, the at least one operation.

In further non-limiting embodiments or aspects, the at least one operation may include an authorization request for a transaction to be completed by the merchant POS device. The at least one operation may also include a user log-in for the merchant POS device to access additional operations of the merchant POS device.

In further non-limiting embodiments or aspects, the AR map data may include a plurality of environmental anchors representative of a physical space of a store of the merchant. The AR map data may also include a plurality of virtual object reference points input by the merchant that are used for identification by the merchant POS device for re-localization. Success or failure of the re-localization process may be determined, at least partially, by at least one of the following: a comparison of a number of successfully identified environmental anchors, a number of successfully identified virtual object reference points, or a combination thereof, to a predetermined threshold.

In further non-limiting embodiments or aspects, the method may include generating, with at least one processor, a prompt for regeneration of the AR map data in response to determining that the AR map data does not satisfy a threshold quality of mapping data. The re-localization process may be combined with, and based at least partially on, input user credentials from the merchant POS device for authentication of the at least one operation. The AR map data may include a first portion associated with a first authorized area of operation and a second portion associated with a second authorized area of operation. Re-localization of the merchant POS device may be based on the first portion or the second portion based on a type of the at least one operation.

According to non-limiting embodiments or aspects, provided is a system for authentication by augmented reality (AR) for fraud prevention. The system includes a server including at least one processor for executing program instructions. The server is programmed and/or configured to receive AR map data of an authorized area of operation associated with a merchant, the AR map data generated from at least one AR recording device and including at least one environmental anchor and at least one virtual object reference point. The server is also programmed and/or configured to store the AR map data in association with a merchant identifier. The server is further programmed and/or configured to receive a request for authentication of at least one operation by at least one merchant point-of-sale (POS) device, the request including the merchant identifier. The server is further programmed and/or configured to communicate at least a portion of the AR map data to the at least one merchant POS device for execution of an AR re-localization process. The server is further programmed and/or configured to, in response to failure of the re-localization process by the at least one merchant POS device, deny authentication of the at least one operation. The server is further programmed and/or configured to, in response to success of the re-localization process by the at least one merchant POS device, authenticate the at least one operation.

In further non-limiting embodiments or aspects, the AR map data may include a plurality of environmental anchors representative of a physical space of a store of the merchant. The AR map data may also include a plurality of virtual object reference points input by the merchant that are used for identification by the merchant POS device for re-localization.

In further non-limiting embodiments or aspects, success or failure of the re-localization process may be determined at least partially by at least one of the following: a comparison of a number of successfully identified environmental anchors, a number of successfully identified virtual object reference points, or a combination thereof, to a predetermined threshold.

In further non-limiting embodiments or aspects, the re-localization process may be combined with and based at least partially on input user credentials from the merchant POS device for authentication of the at least one operation. The AR map data may include a first portion associated with a first authorized area of operation and a second portion associated with a second authorized area of operation. Re-localization of the merchant POS device may be based on the first portion or the second portion based on a type of the at least one operation.

According to non-limiting embodiments or aspects, provided is a computer program product for authentication by augmented reality (AR) for fraud prevention. The computer program product includes at least one non-transitory computer-readable medium including program instructions that, when executed by at least one processor, cause the at least one processor to receive AR map data of an authorized area of operation associated with a merchant. The AR map data is generated from at least one AR recording device and includes at least one environmental anchor and at least one virtual object reference point. The computer instructions also cause the at least one processor to store the AR map data in association with a merchant identifier. The computer instructions also cause the at least one processor to receive a request for authentication of at least one operation by at least one merchant point-of-sale (POS) device, the request including the merchant identifier. The computer instructions further cause the at least one processor to communicate at least a portion of the AR map data to the at least one merchant POS device for execution of an AR re-localization process. The computer instructions further cause the at least one processor to, in response to failure of the re-localization process by the at least one merchant POS device, deny authentication of the at least one operation. The computer instructions further cause the at least one processor to, in response to success of the re-localization process by the at least one merchant POS device, authenticate the at least one operation.

In further non-limiting embodiments or aspects, the AR map data may include a plurality of environmental anchors representative of a physical space of a store of the merchant. The AR map data may include a plurality of virtual object reference points input by the merchant that are used for identification by the merchant POS device for re-localization. Success or failure of the re-localization process may be determined at least partially by at least one of the following: a comparison of a number of successfully identified environmental anchors, a number of successfully identified virtual object reference points, or a combination thereof, to a predetermined threshold. The AR map data may include a first portion associated with a first authorized area of operation and a second portion associated with a second authorized area of operation. Re-localization of the merchant POS device may be based on the first portion or the second portion based on a type of the at least one operation.

According to non-limiting embodiments or aspects, provided is a method for authentication by augmented reality (AR) for fraud prevention. The method includes generating AR map data of an authorized area of operation associated with a merchant. The AR map data includes at least one environmental anchor and at least one virtual object reference point. The method also includes communicating a request for authentication of at least one operation by a merchant point-of-sale (POS) device, the request including a merchant identifier. The method further includes receiving at least a portion of the AR map data for execution of an AR re-localization process. The method further includes executing the re-localization process. The method further includes: (i) in response to failure of the re-localization process, halting the at least one operation; and (ii) in response to success of the re-localization process, proceeding with the at least one operation.

In further non-limiting embodiments or aspects, the at least one operation may include an authorization request for a transaction to be completed by the merchant POS device. The at least one operation may also include a user log-in for the merchant POS device to access additional operations of the merchant POS device.

In further non-limiting embodiments or aspects, the AR map data may include a plurality of environmental anchors representative of a physical space of a store of the merchant. The AR map data may include a plurality of virtual object reference points input by the merchant that are used for identification by the merchant POS device for re-localization. Success or failure of the re-localization process may be determined at least partially by at least one of the following: a comparison of a number of successfully identified environmental anchors, a number of successfully identified virtual object reference points, or a combination thereof, to a predetermined threshold.

In further non-limiting embodiments or aspects, the method may include generating, with at least one processor, a prompt for regeneration of the AR map data in response to determining that the AR map data does not satisfy a threshold quality of mapping data. The re-localization process may be combined with, and based at least partially on, input user credentials for authentication of the at least one operation.

The AR map data may include a first portion associated with a first authorized area of operation and a second portion associated with a second authorized area of operation. Re-localization of the merchant POS device may be based on the first portion or the second portion based on a type of the at least one operation.

According to non-limiting embodiments or aspects, provided is a system for authentication by augmented reality (AR) for fraud prevention. The system includes a mobile device including at least one processor for executing program instructions. The mobile device is programmed and/or configured to generate AR map data of an authorized area of operation associated with a merchant. The AR map data includes at least one environmental anchor and at least one virtual object reference point. The mobile device is programmed and/or configured to communicate a request for authentication of at least one operation by the mobile device, the request including a merchant identifier. The mobile device may be programmed and/or configured to receive at least a portion of the AR map data for execution of an AR re-localization process. The mobile device is programmed and/or configured to execute the re-localization process. The mobile device is programmed and/or configured to: (i) in response to failure of the re-localization process, halt the at least one operation; and (ii) in response to success of the re-localization process, proceed with the at least one operation.

In further non-limiting embodiments or aspects, the AR map data may include a plurality of environmental anchors representative of a physical space of a store of the merchant. The AR map data may include a plurality of virtual object reference points input by the merchant that are used for identification by the mobile device for re-localization. Success or failure of the re-localization process may be determined at least partially by at least one of the following: a comparison of a number of successfully identified environmental anchors, a number of successfully identified virtual object reference points, or a combination thereof, to a predetermined threshold.

In further non-limiting embodiments or aspects, the re-localization process may be combined with, and based at least partially on, input user credentials for authentication of the at least one operation. The AR map data may include a first portion associated with a first authorized area of operation and a second portion associated with a second authorized area of operation. Re-localization of the merchant POS device may be based on the first portion or the second portion based on a type of the at least one operation.

According to non-limiting embodiments or aspects, provided is a computer program product for authentication by augmented reality (AR) for fraud prevention. The computer program product may include at least one non-transitory computer-readable medium including program instructions that, when executed by at least one processor, cause the at least one processor to generate AR map data of an authorized area of operation associated with a merchant. The AR map data includes at least one environmental anchor and at least one virtual object reference point. The program instructions cause the at least one processor to communicate a request for authentication of at least one operation by at least one merchant point-of-sale (POS) device, the request including a merchant identifier. The program instructions cause the at least one processor to receive at least a portion of the AR map data for execution of an AR re-localization process. The program instructions cause the at least one processor to execute the re-localization process. The program instructions cause the at least one processor to: (i) in response to failure of the re-localization process, halt the at least one operation; and (ii) in response to success of the re-localization process, proceed with the at least one operation.

In further non-limiting embodiments or aspects, the AR map data may include a plurality of environmental anchors representative of a physical space of a store of the merchant. The AR map data may include a plurality of virtual object reference points input by the merchant that are used for re-localization. Success or failure of the re-localization process may be determined at least partially by at least one of the following: a comparison of a number of successfully identified environmental anchors, a number of successfully identified virtual object reference points, or a combination thereof, to a predetermined threshold. The AR map data may include a first portion associated with a first authorized area of operation and a second portion associated with a second authorized area of operation. Re-localization may be based on the first portion or the second portion based on a type of the at least one operation.

Other non-limiting embodiments or aspects of the present disclosure will be set forth in the following numbered clauses:

Clause 1: A computer-implemented method for authentication by augmented reality (AR) for fraud prevention, the method comprising: receiving, with at least one processor, AR map data of an authorized area of operation associated with a merchant, the AR map data generated from at least one AR recording device and comprising at least one environmental anchor and at least one virtual object reference point; storing, with at least one processor, the AR map data in association with a merchant identifier; receiving, with at least one processor, a request for authentication of at least one operation by at least one merchant point-of-sale (POS) device, the request comprising the merchant identifier; communicating, with at least one processor, at least a portion of the AR map data to the at least one merchant POS device for execution of an AR re-localization process; and (i) in response to failure of the re-localization process by the at least one merchant POS device, denying, with at least one processor, authentication of the at least one operation; and (ii) in response to success of the re-localization process by the at least one merchant POS device, authenticating, with at least one processor, the at least one operation.

Clause 2: The method of clause 1, wherein the at least one operation comprises an authorization request for a transaction to be completed by the merchant POS device.

Clause 3: The method of clause 1 or clause 2, wherein the at least one operation comprises a user log-in for the merchant POS device to access additional operations of the merchant POS device.

Clause 4: The method of any of clauses 1-3, wherein the AR map data comprises a plurality of environmental anchors representative of a physical space of a store of the merchant.

Clause 5: The method of any of clauses 1-4, wherein the AR map data comprises a plurality of virtual object reference points input by the merchant that are used for identification by the merchant POS device for re-localization.

Clause 6: The method of any of clauses 1-5, wherein success or failure of the re-localization process is determined at least partially by at least one of the following: a comparison of a number of successfully identified environmental anchors, a number of successfully identified virtual object reference points, or a combination thereof, to a predetermined threshold.

Clause 7: The method of any of clauses 1-6, further comprising generating, with at least one processor, a prompt for regeneration of the AR map data in response to determining that the AR map data does not satisfy a threshold quality of mapping data.

Clause 8: The method of any of clauses 1-7, wherein the re-localization process is combined with, and based at least partially on, input user credentials from the merchant POS device for authentication of the at least one operation.

Clause 9: The method of any of clauses 1-8, wherein the AR map data comprises a first portion associated with a first authorized area of operation and a second portion associated with a second authorized area of operation, and wherein re-localization of the merchant POS device is based on the first portion or the second portion based on a type of the at least one operation.

Clause 10: A system for authentication by augmented reality (AR) for fraud prevention, the system comprising a server including at least one processor for executing program instructions, the server being programmed and/or configured to: receive AR map data of an authorized area of operation associated with a merchant, the AR map data generated from at least one AR recording device and comprising at least one environmental anchor and at least one virtual object reference point; store the AR map data in association with a merchant identifier; receive a request for authentication of at least one operation by at least one merchant point-of-sale (POS) device, the request comprising the merchant identifier; communicate at least a portion of the AR map data to the at least one merchant POS device for execution of an AR re-localization process; and (i) in response to failure of the re-localization process by the at least one merchant POS device, deny authentication of the at least one operation; and (ii) in response to success of the re-localization process by the at least one merchant POS device, authenticate the at least one operation.

Clause 11: The system of clause 10, wherein the AR map data comprises a plurality of environmental anchors representative of a physical space of a store of the merchant.

Clause 12: The system of clause 10 or clause 11, wherein the AR map data comprises a plurality of virtual object reference points input by the merchant that are used for identification by the merchant POS device for re-localization.

Clause 13: The system of any of clauses 10-12, wherein success or failure of the re-localization process is determined at least partially by at least one of the following: a comparison of a number of successfully identified environmental anchors, a number of successfully identified virtual object reference points, or a combination thereof, to a predetermined threshold.

Clause 14: The system of any of clauses 10-13, wherein the re-localization process is combined with, and based at least partially on input user credentials from the merchant POS device for authentication of the at least one operation.

Clause 15: The system of any of clauses 10-14, wherein the AR map data comprises a first portion associated with a first authorized area of operation and a second portion associated with a second authorized area of operation, and wherein re-localization of the merchant POS device is based on the first portion or the second portion based on a type of the at least one operation.

Clause 16: A computer program product for authentication by augmented reality (AR) for fraud prevention, the computer program product comprising at least one non-transitory computer-readable medium including program instructions that, when executed by at least one processor, cause the at least one processor to: receive AR map data of an authorized area of operation associated with a merchant, the AR map data generated from at least one AR recording device and comprising at least one environmental anchor and at least one virtual object reference point; store the AR map data in association with a merchant identifier; receive a request for authentication of at least one operation by at least one merchant point-of-sale (POS) device, the request comprising the merchant identifier; communicate at least a portion of the AR map data to the at least one merchant POS device for execution of an AR re-localization process; and (i) in response to failure of the re-localization process by the at least one merchant POS device, deny authentication of the at least one operation; and (ii) in response to success of the re-localization process by the at least one merchant POS device, authenticate the at least one operation.

Clause 17: The computer program product of clause 16, wherein the AR map data comprises a plurality of environmental anchors representative of a physical space of a store of the merchant.

Clause 18: The computer program product of clause 16 or clause 17, wherein the AR map data comprises a plurality of virtual object reference points input by the merchant that are used for identification by the merchant POS device for re-localization.

Clause 19: The computer program product of any of clauses 16-18, wherein success or failure of the re-localization process is determined at least partially by at least one of the following: a comparison of a number of successfully identified environmental anchors, a number of successfully identified virtual object reference points, or a combination thereof, to a predetermined threshold.

Clause 20: The computer program product of any of clauses 16-19, wherein the AR map data comprises a first portion associated with a first authorized area of operation and a second portion associated with a second authorized area of operation, and wherein re-localization of the merchant POS device is based on the first portion or the second portion based on a type of the at least one operation.

Clause 21: A method for authentication by augmented reality (AR) for fraud prevention, the method comprising: generating AR map data of an authorized area of operation associated with a merchant, the AR map data comprising at least one environmental anchor and at least one virtual object reference point; communicating a request for authentication of at least one operation by a merchant point-of-sale (POS) device, the request comprising a merchant identifier; receiving at least a portion of the AR map data for execution of an AR re-localization process; executing the re-localization process; and (i) in response to failure of the re-localization process, halting the at least one operation; and (ii) in response to success of the re-localization process, proceeding with the at least one operation.

Clause 22: The method of clause 21, wherein the at least one operation comprises an authorization request for a transaction to be completed by the merchant POS device.

Clause 23: The method of clause 21 or clause 22, wherein the at least one operation comprises a user log-in for the merchant POS device to access additional operations of the merchant POS device.

Clause 24: The method of any of clauses 21-23, wherein the AR map data comprises a plurality of environmental anchors representative of a physical space of a store of the merchant.

Clause 25: The method of any of clauses 21-24, wherein the AR map data comprises a plurality of virtual object reference points input by the merchant that are used for identification by the merchant POS device for re-localization.

Clause 26: The method of any of clauses 21-25, wherein success or failure of the re-localization process is determined at least partially by at least one of the following: a comparison of a number of successfully identified environmental anchors, a number of successfully identified virtual object reference points, or a combination thereof, to a predetermined threshold.

Clause 27: The method of any of clauses 21-26, further comprising generating, with at least one processor, a prompt for regeneration of the AR map data in response to determining that the AR map data does not satisfy a threshold quality of mapping data.

Clause 28: The method of any of clauses 21-27, wherein the re-localization process is combined with, and based at least partially on, input user credentials for authentication of the at least one operation.

Clause 29: The method of any of clauses 21-28, wherein the AR map data comprises a first portion associated with a first authorized area of operation and a second portion associated with a second authorized area of operation, and wherein re-localization of the merchant POS device is based on the first portion or the second portion based on a type of the at least one operation.

Clause 30: A system for authentication by augmented reality (AR) for fraud prevention, the system comprising a mobile device including at least one processor for executing program instructions, the mobile device being programmed and/or configured to: generate AR map data of an authorized area of operation associated with a merchant, the AR map data comprising at least one environmental anchor and at least one virtual object reference point; communicate a request for authentication of at least one operation by the mobile device, the request comprising a merchant identifier; receive at least a portion of the AR map data for execution of an AR re-localization process; execute the re-localization process; and (i) in response to failure of the re-localization process, halt the at least one operation; and (ii) in response to success of the re-localization process, proceed with the at least one operation.

Clause 31: The system of clause 30, wherein the AR map data comprises a plurality of environmental anchors representative of a physical space of a store of the merchant.

Clause 32: The system of clause 30 or clause 31, wherein the AR map data comprises a plurality of virtual object reference points input by the merchant that are used for identification by the mobile device for re-localization.

Clause 33: The system of any of clauses 30-32, wherein success or failure of the re-localization process is determined at least partially by at least one of the following: a comparison of a number of successfully identified environmental anchors, a number of successfully identified virtual object reference points, or a combination thereof, to a predetermined threshold.

Clause 34: The system of any of clauses 30-33, wherein the re-localization process is combined with, and based at least partially on, input user credentials for authentication of the at least one operation.

Clause 35: The system of any of clauses 30-34, wherein the AR map data comprises a first portion associated with a first authorized area of operation and a second portion associated with a second authorized area of operation, and wherein re-localization of the merchant POS device is based on the first portion or the second portion based on a type of the at least one operation.

Clause 36: A computer program product for authentication by augmented reality (AR) for fraud prevention, the computer program product comprising at least one non-transitory computer-readable medium including program instructions that, when executed by at least one processor, cause the at least one processor to: generate AR map data of an authorized area of operation associated with a merchant, the AR map data comprising at least one environmental anchor and at least one virtual object reference point; communicate a request for authentication of at least one operation by at least one merchant point-of-sale (POS) device, the request comprising a merchant identifier; receive at least a portion of the AR map data for execution of an AR re-localization process; execute the re-localization process; and (i) in response to failure of the re-localization process, halt the at least one operation; and (ii) in response to success of the re-localization process, proceed with the at least one operation.

Clause 37: The computer program product of clause 36, wherein the AR map data comprises a plurality of environmental anchors representative of a physical space of a store of the merchant.

Clause 38: The computer program product of clause 36 or clause 37, wherein the AR map data comprises a plurality of virtual object reference points input by the merchant that are used for re-localization.

Clause 39: The computer program product of any of clauses 36-38, wherein success or failure of the re-localization process is determined at least partially by at least one of the following: a comparison of a number of successfully identified environmental anchors, a number of successfully identified virtual object reference points, or a combination thereof, to a predetermined threshold.

Clause 40: The computer program product of any of clauses 36-39, wherein the AR map data comprises a first portion associated with a first authorized area of operation and a second portion associated with a second authorized area of operation, and wherein re-localization is based on the first portion or the second portion based on a type of the at least one operation.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DETAILED DESCRIPTION

Figure 1:
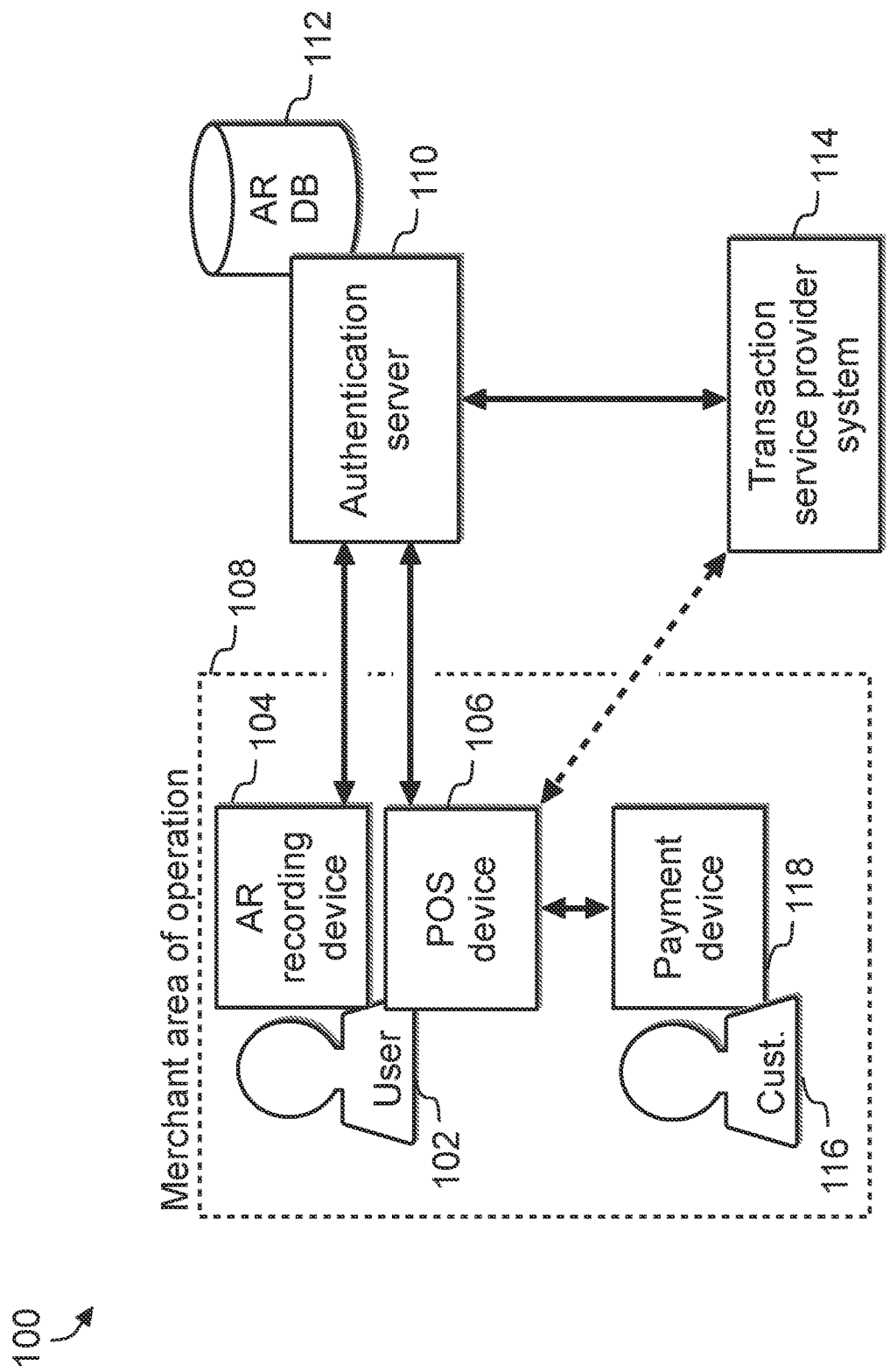
FIG. 1 is a schematic diagram of one embodiment or aspect of a system for authentication by augmented reality (AR) for fraud prevention.

For purposes of the description hereinafter, the terms "end," "upper," "lower," "right," "left," "vertical," "horizontal," "top," "bottom," "lateral," "longitudinal," and derivatives thereof shall relate to the embodiments or aspects as they are oriented in the drawing figures. However, it is to be understood that the illustrated embodiments or aspects are not to be interpreted as limiting and may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments or aspects, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a primary account number (PAN), to a user that uniquely identifies one or more accounts associated with the user. The account identifier may be used by the user to conduct a payment transaction. In some non-limiting embodiments or aspects, an issuer may be associated with a bank identification number (BIN) that uniquely identifies the issuer. As used herein "issuer system" may refer to one or more systems operated by or operated on behalf of an issuer. For example, an issuer system may refer to a server executing one or more software applications associated with the issuer. In some non-limiting embodiments or aspects, an issuer system may include one or more servers (e.g., one or more authorization servers) for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The terms "point-of-sale system," "POS system," "POS device," or "POS terminal," as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction. A POS terminal may be located proximal to a user, such as at a physical store location, or a POS terminal may be remote from the user, such as a server interacting with a user browsing on their personal computer. POS terminals may include mobile devices.

As used herein, the term "account identifier" may refer to one or more types of identifiers associated with an account (e.g., a unique identifier of an account, an account number, a PAN, a card number, a payment card number, a token, and/or the like) of a user. In some non-limiting embodiments or aspects, an issuer may provide an account identifier to a user that uniquely identifies one or more accounts associated with that user. In some non-limiting embodiments or aspects, an account identifier may be embodied on a payment device (e.g., a payment card, a credit card, a debit card, and/or the like) and/or may be electronic information communicated to the user that the user may use for electronic payment transactions. In some non-limiting embodiments or aspects, an account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments or aspects, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "account token" may refer to an identifier that is used as a substitute or replacement identifier for an account identifier, such as a PAN. An account token may be used as a substitute or replacement identifier for an original account identifier, such as a PAN. Account tokens may be associated with a PAN or other original account identifier in one or more data structures (e.g., one or more databases and/or the like) such that they may be used to conduct a transaction without directly using the original account identifier. In some non-limiting embodiments or aspects, an original account identifier, such as a PAN, may be associated with a plurality of account tokens for different individuals or purposes. In some non-limiting embodiments or aspects, account tokens may be associated with a PAN or other account identifiers in one or more data structures such that they can be used to conduct a transaction without directly using the account identifier, such as a PAN. In some examples, an account identifier, such as a PAN, may be associated with a plurality of account tokens for different uses or different purposes.

As used herein, the term "computing device" may refer to one or more electronic devices that include one or more processors. A computing device may be a stationary computer or a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also include components to send, receive, and/or process data, such as but not limited to memory, a display device, an input device, a network interface, and/or the like.

As used herein, the term "payment device" may refer to a payment card, such as a credit card, a debit card, a charge card, a gift card, a payroll card, and/or the like, associated with an account identifier of a payment account. In some non-limiting embodiments or aspects, a payment device may include an electronic payment device, such as a smartcard, a chip card, integrated circuit card, and/or the like. An electronic payment device may include an embedded integrated circuit and the embedded integrated circuit may include a data storage medium (e.g., volatile and/or non-volatile memory) to store information associated with the payment device, such as an account identifier, a name of the account holder, and/or the like.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more devices, such as one or more processors, servers, and computing devices that include software applications, and/or the like.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

Payment device transactions are utilized in a variety of environments. In a conventional shopping environment, e.g., in a "card present" transaction, a customer provides a merchant with a payment device during checkout, and the merchant verifies, through various means, that the payment device belongs to the user. In other environments, due to the widespread adoption of electronic commerce (e-commerce), more merchants are putting their products and services on websites for customers to purchase online, e.g., in "card not present" (CNP) transactions. In those types of online transactions, the shipping of the product simply transmits information and/or usage credit to an email address, a user account with the merchant, or any suitable mechanism to make the product/service available to the purchaser.

To avoid and/or detect fraudulent transactions during CNP transaction scenarios, many payment gateways provide fraud detection filters for merchants to use to take action against fraudulent transactions. Some examples include: a daily velocity filter; an hourly velocity filter; a suspicious transaction filter; an address verification system (AVS); an authorized application programming interface (API) internet protocol (IP) address filter; an IP address blocking filter; a card verification value (CVV) handling filter; a shipping address verification filter; an IP-shipping address mismatch filter; a regional IP address filter; and/or the like.

A daily velocity filter allows a merchant to specify a threshold for the number of transactions allowed per day. All transactions exceeding the threshold in that day will be flagged and processed according to a filter action set by the merchant. An hourly velocity filter allows a merchant to specify a threshold for the number of transactions allowed per hour. All transactions exceeding the threshold in that day will be flagged and processed according to the filter action set by the merchant. A suspicious transaction filter is based on a collected knowledge base of transaction behaviors and fraud detection analysis. An AVS filter detects mismatched billing address fields. An authorized API IP address filter configures a list of authorized server IP addresses from which API transactions will be accepted by a payment gateway. Any API transactions submitted from an IP address not include in the list will be rejected. An IP address blocking filter allows a merchant to block transactions submitted from IP addresses known to be the source of suspicious or fraudulent transactions. The above exemplary filters provide greater protection against customers who attempt to make fraudulent transactions in CNP scenarios. However, in scenarios where large stores have multiple POS devices where shopkeepers use the same merchant account to accept transactions, merchants are at risk from fraudulent attackers who try to hack/steal POS devices. Due to widespread adoption of POS systems like mobile point-of-sale (mPOS) systems, which may include an app running on a mobile device that can act as a POS device, merchants have fewer options to prevent fraudulent transactions.

Non-limiting embodiments or aspects of the present disclosure are directed to a system, method, and computer program product for authentication by augmented reality (AR) for fraud prevention. Described systems and methods provide a new authentication architecture using recorded AR map data to define areas of authorized operation. The described authentication architecture is safer and more resilient to the theft and/or hacking of POS devices. Moreover, the described authentication architecture is more precise for POS device location-based authentication, by using preconfigured environmental anchors and/or virtual object reference points to define operational zones. Because of the increased precision, multiple different areas of operation may be generated and overlap and/or located closer together. Areas of operation may be configured by merchants to be associated with different operational parameters, allowing for greater user control of the deployed system. Furthermore, the unconventional injection of an AR-based authentication process to a transaction processing leverages provides for increased security and performance of merchant store, computer-based transaction networks.

With specific reference to FIG. 1, and in non-limiting embodiments or aspects, provided is a system 100 for authentication by augmented reality (AR) for fraud prevention. The system 100 may be used to authenticate transactions of a merchant POS device 106. In an initial setup process, a user 102 may capture AR map data generated from at least one AR recording device 104. AR map data may include one or more points in a three-dimensional space that define an area for use of augmented reality technology. An AR recording device 104 may include any computing device with a camera, e.g., a mobile device, configured for capturing one or more points in a three-dimensional space for creation of AR map data. The AR recording device 104 may be the same device as a POS device 106. The AR map data may include at least one environmental anchor and at least one virtual object reference point. An environmental anchor may include one or more points in three-dimensional space and may be associated with a physical object, surface and/or the like, that may constitute a reference marker for AR localization. AR localization, also referred to herein and throughout as "re-localization," may refer to a process by which a computing device with a camera determines its spatial position vis-à-vis predefined parameters of AR map data. A virtual object reference point may include at least one point in three-dimensional space, not necessarily associated with a physical object, surface, and/or the like, that may be aligned with other points in a physical space for AR localization.

The AR map data may also be specific to a merchant area of operation 108. AR map data may be generated for more than one area of operation 108, each of which may have its own environmental anchors and virtual object reference points, and areas of operation 108 may overlap. Virtual object reference points may also be input by a user 102 to act as references for re-localization. The AR map data may be communicated from the AR recording device 104 to an authentication server 110 and recorded in an AR database 112. The authentication server 110 may be located remotely from the merchant and may facilitate authentication for multiple merchants. The AR map data may be associated with a merchant identifier, and areas of operation 108 may be associated with one or more unique identifiers. Furthermore, areas of operation 108 may be stored in association with permitted operational parameters, such that one or more types of operation (e.g., transaction) are allowed or prohibited within the area of operation 108. If the originally captured AR map data from the AR recording device 104 does not satisfy a threshold quality of mapping data, e.g., the authentication server 110 determines that the number of reference points is too low, the confidence of AR map data generation is too low, too many errors were generated, and/or the like, the authentication server 110 may communicate a prompt to the AR recording device 104 to regenerate the AR map data. The AR recording device 104 may also evaluate the quality of mapping data locally and prompt for regeneration, in addition to, or alternatively to, the authentication server 110.

The AR recording device 104 may create AR map data by recording a cloud of points in a three-dimensional space, which may be used as references for AR localization. The AR recording device 104 may automatically detect environmental anchors as the camera of the AR recording device 104 moves in the physical space. Virtual object reference points may be input for alignment with physical features. It will also be appreciated that areas of operation, as defined by AR map data, may overlap or be combined when executing a re-localization process.

After initial setup, a user 102 may seek to complete an operation using a POS device 106. Operations may include, but are not limited to, logging in to the POS device 106, requesting authorization for a transaction with a customer 116, accessing inventory data, initiating an inventory management process, and/or the like. The user 102, via the POS device 106, may communicate a request to the authentication server 110 for authentication of the operation. In response, the authentication server 110 may communicate at least a portion of the AR map data to the POS device 106 for the POS device 106 to attempt an AR re-localization process. If the re-localization process is not successful, the POS device 106 may locally halt its operation and prompt the user 102 to try again. Moreover, the authentication server 110 may deny authentication of the requested operation. If the re-localization process is successful, the authentication server 110 may authenticate the requested operation and the POS device 106 may communicate further data in execution of the operation. Successful re-localization may require the POS device 106 to communicate at least a portion of new AR mapping data of the current environment of the POS device 106 to the authentication server 110, which the authentication server 110 may compare against previously stored AR mapping data. In this manner, fraudulent operations on the POS device 106 would be impossible without accurately replicating the pre-defined AR environment.

It will be appreciated that any type of user 102 may operate the POS device 106. Although a merchant personnel operating the POS device 106 is a common user 102, a user 102 not necessarily associated with the merchant may attempt to use the POS device 106, and therefore trigger re-localization. For example, the POS device 106 may be a mobile checkout device that allows a user 102 to scan items in the store and pay for items in an authorized checkout area. In such a case, the user 102 of the POS device 106 may be a customer 116 that is completing a transaction with the POS device 106 using a payment device 118. In another example, a prospective user 102 of the POS device 106 may be an unauthorized person who has stolen the POS device 106 and is attempting to access its functionality at a remote location. As the POS device 106 communicates with the authentication server 110 to attempt re-localization, re-localization will fail, therefore blocking the unauthorized user 102 from accessing one or more functions of the POS device 106.

If the requested operation is a transaction to be completed by the POS device 106, e.g., a transaction with a customer 116 and the customer's 116 payment device 118, the authentication server 110 may thereafter communicate an authorization request for the transaction from the POS device 106 to a transaction service provider system 114 for clearance and settlement of the transaction. The authentication server 110 may also communicate a key to the POS device 106 that allows the POS device 106 to communicate the transaction authorization request to the transaction service provider system 114. The key may activate a payment functionality of the POS device 106 or may serve to authenticate the POS device 106 to the transaction service provider system 114.

If the requested operation is a log-in operation wherein a user 102 seeks to provide credentials to access certain functionality of the POS device 106, the authentication server 110 may communicate acknowledgement and/or confirmation of the POS device's 106 re-localization to the POS device 106, which may unlock one or more functions of the POS device 106. The POS device 106 may also be programmed to, in response to successful re-localization, automatically locally permit use of one or more POS device 106 functions. Additionally, the re-localization process may be combined with and based at least partially on user 102 credentials for authentication of one or more operations. For example, a merchant personnel may be prompted to input an employee identifier along with executing the re-localization process on the POS device 106. Authentication at least partially based on re-localization may also be dependent on the area of operation 108 of the POS device 106. The POS device 106 may successfully localize in one area of operation 108, allowing one or more operations, but may be prohibited from other operations not authorized for the area of operation 108.

Figure 2:
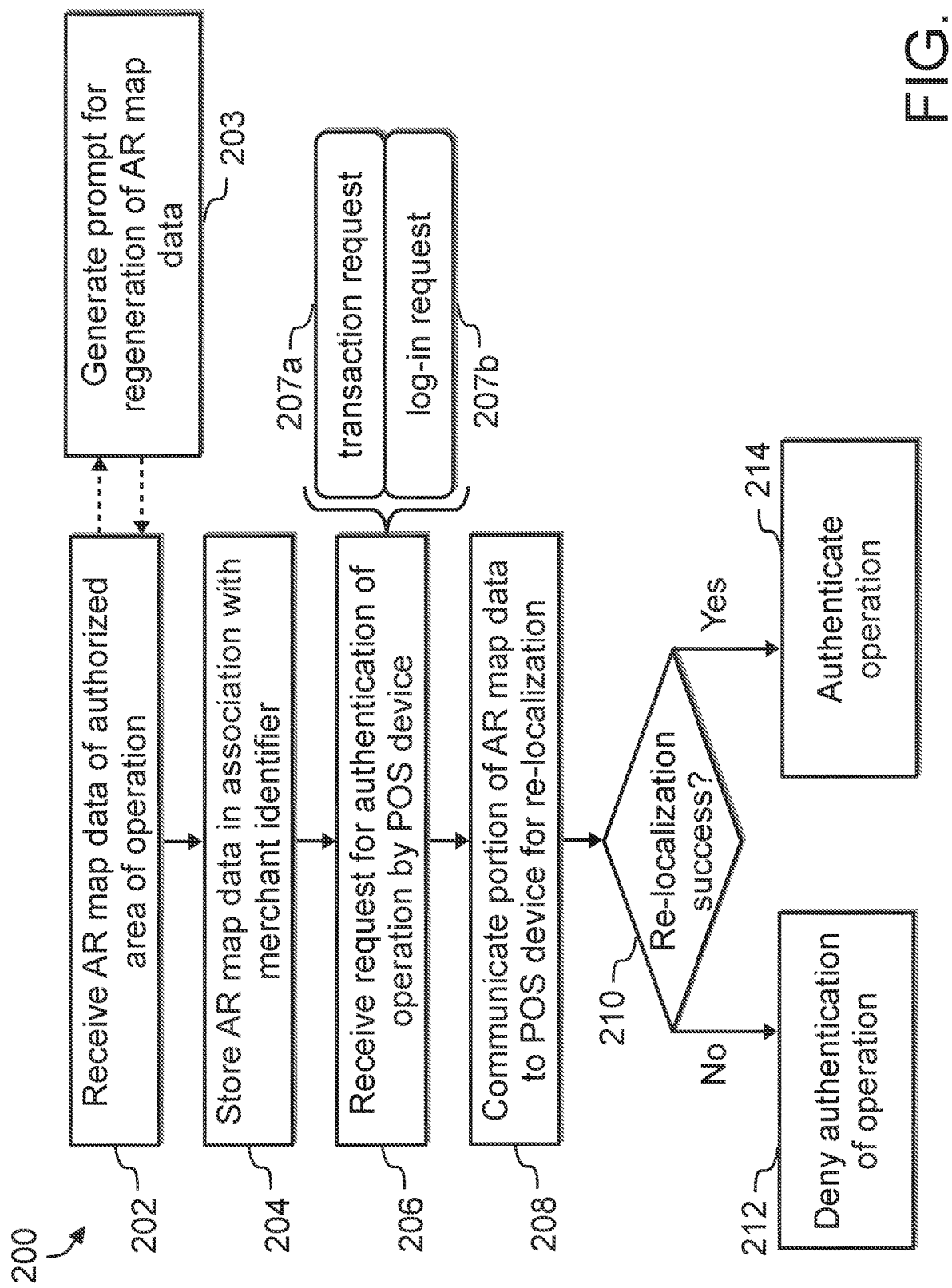
FIG. 2 is a process diagram of one embodiment or aspect of a system for authentication by augmented reality (AR) for fraud prevention.

With specific reference to FIG. 2, and in non-limiting embodiments or aspects, provided is a method 200 for authentication by augmented reality (AR) for fraud prevention. Each of the steps of method 200 may be performed by one or more processors of an authentication server, a transaction service provider, a third party server, or a combination thereof. In step 202, the authentication server may receive AR map data of one or more authorized areas of operation associated with a merchant. The AR map data may include a plurality of environmental anchors representative of a physical space of a store of the merchant. The AR map data may also include a plurality of virtual object reference points input by the merchant that are used for identification by the merchant POS device for re-localization. In step 203, the authentication server may determine that the AR map data does not satisfy a predetermined threshold of AR mapping quality, and therefore may generate and communicate a prompt for regeneration of the AR map data (e.g., updated image capture, environmental anchors, virtual object reference points, and/or the like). In step 204, the authentication server may store the AR map data in an AR database in association with a merchant identifier. A merchant identifier may include, but is not limited to, a merchant name, a merchant identification number, a merchant area of operation identifier, a merchant hash key, and/or the like.

In step 206, the authentication server may receive a request for authentication of one or more operations of one or more merchant POS devices. Requested operations may include, but are not limited to, logging in to the POS device (e.g., a log-in request 207*b*), requesting authorization for a transaction with a customer (e.g., a transaction request 207*a*), accessing inventory data, initiating an inventory management process, and/or the like. A request for authentication may likewise include a merchant identifier, by which stored AR map data corresponding to the merchant and/or area of operation may be retrieved. In step 208, the authentication server may communicate at least a portion of the AR map data to a requesting POS device for execution of an AR re-localization process on the POS device. In step 210, the authentication server and/or the POS device may determine the success of the re-localization process based on the AR map data. Success or failure of the re-localization process may be determined at least partially by a comparison of a number of successfully identified environmental anchors, a comparison of a number of successfully identified virtual object reference points, or a combination thereof, to a predetermined threshold. In response to failure of the re-localization process by a POS device, in step 212, the authentication server and/or POS device may deny authentication of one or more operations prompted by a user of the POS device. In response to success of the re-localization process by a POS device, in step 214, the authentication server and/or POS device may authenticate one or more operations prompted by a user of the POS device.

It will be appreciated that re-localization may be combined with and/or based at least partially on a security process, e.g., input user credentials from the merchant POS device for authentication of an operation. It will further be appreciated that the AR map data may include one or more portions associated with one or more (e.g., authorized) areas of operation. To illustrate, the AR map data may have a first portion associated with a first authorized area of operation and a second portion associated with a second authorized area of operation. Re-localization may be determined from one of the areas of operation based on the type of requested operation, and/or authorized operations may be determined from localization to one or more areas of operation. For example, the authentication server may receive a request for a first type of operation (e.g., sale transaction) and communicate a portion of the AR map data for re-localization corresponding to an area of operation that is associated with that first type of operation. In another example, the authentication server may communicate one or more portions of AR map data to allow the POS device to localize and to determine which area of operation the POS device is in, thereby authenticating those operations that were predetermined by the merchant to be authorized in that area of operation. It will be appreciated that many configurations are possible.

Figure 3:
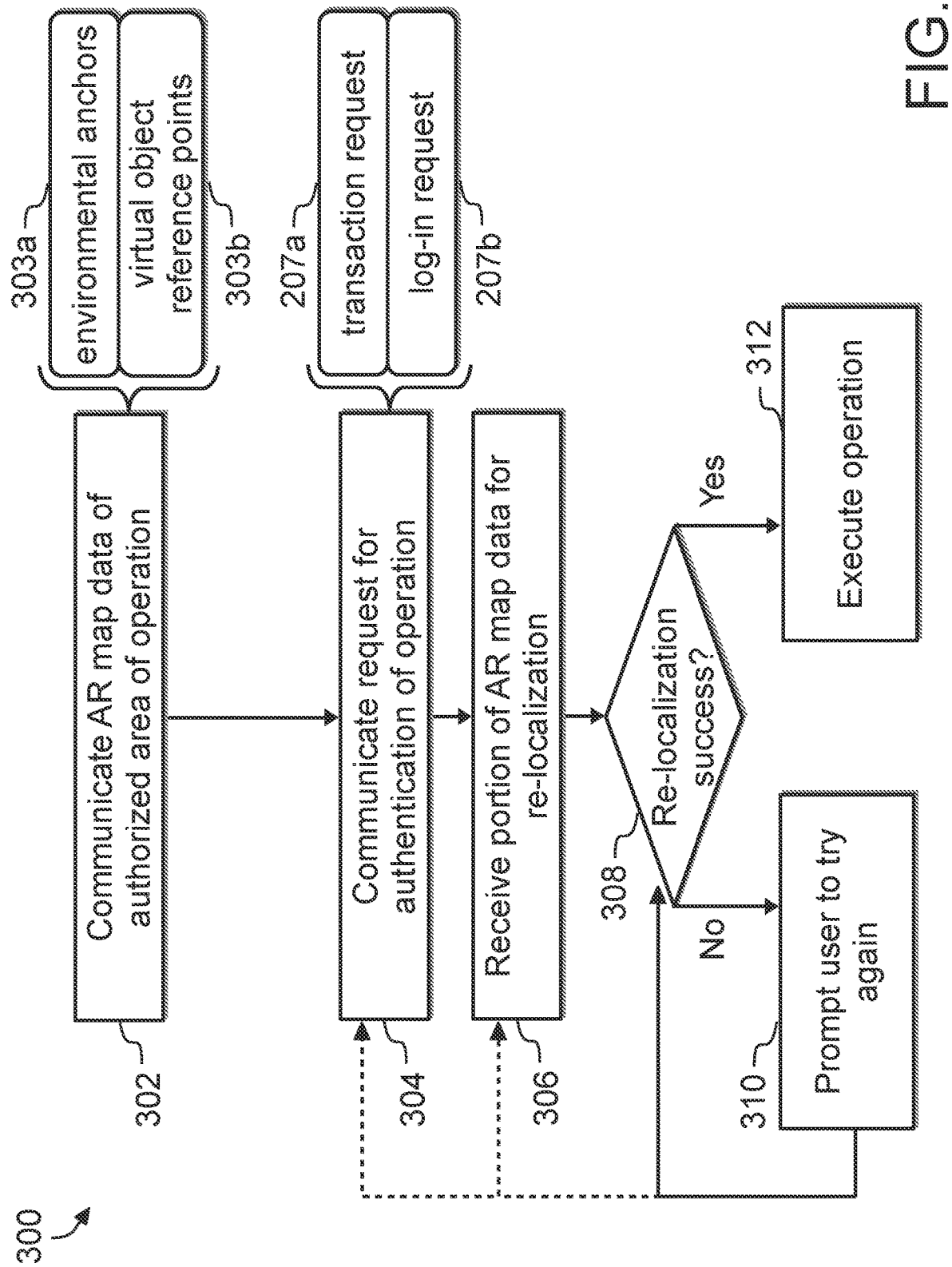
FIG. 3 is a process diagram of one embodiment or aspect of a system for authentication by augmented reality (AR) for fraud prevention.

With specific reference to FIG. 3, and in non-limiting embodiments or aspects, provided is a method 300 for authentication by augmented reality (AR) for fraud prevention. Each of the steps of method 300 may be performed by one or more processors of an AR recording device, a POS device, a mobile device, a third party computing device, or a combination thereof. An AR recording device may be the same device as a POS device, and both may be a mobile device. In step 302, an AR recording device may generate and communicate AR map data of an area of operation associated with a merchant. The AR map data may include one or more environmental anchors 303a and one or more virtual object reference points 303b to be used in re-localization by a POS device. In step 304, a POS device may communicate a request for authentication of one or more operations. Requested operations may include, but are not limited to, logging in to the POS device (e.g., a log-in request 207b), requesting authorization for a transaction with a customer (e.g., a transaction request 207a), accessing inventory data, initiating an inventory management process, and/or the like. In step 306, the POS device may receive at least a portion of the AR map data from the authentication server to execute a re-localization process. In step 308, the AR recording device and/or the authentication server may determine if the re-localization process was a success. In response to failure of the re-localization process by the POS device, the user of the POS device may be prompted to try again, in step 310, thereafter sending the user back to step 304, 306, or 308. In response to success of the re-localization process by the POS device, in step 312, the POS device may proceed to execute the operation.

Figure 4:
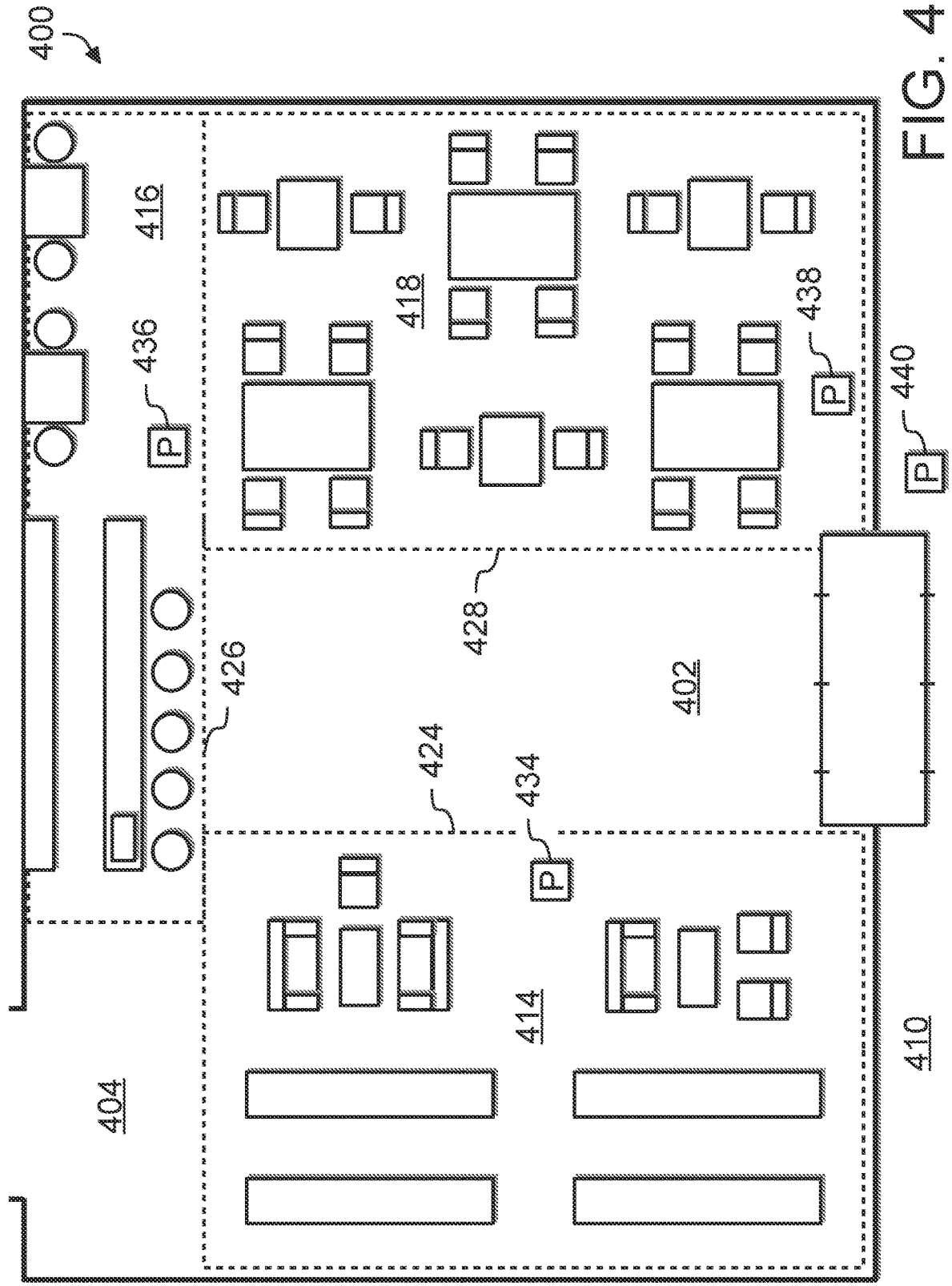
FIG. 4 is an illustrative diagram of one embodiment or aspect of a system for authentication by augmented reality (AR) for fraud prevention.

With specific reference to FIG. 4, and in non-limiting embodiments or aspects, provided is an illustrative diagram of a system and method for authentication by augmented reality (AR) for fraud prevention. Depicted is a merchant store 400 partitioned into a number of authorized areas of operation and areas of non-operation for POS devices 434, 436, 438. The layout and types of transactions for the example store 400 are merely illustrative and will be understood not to limit the scope of the disclosure. The store 400 includes a bookstore 414 located in a first area of operation 424, a bar 416 in a second area of operation 426, and a restaurant 418 in a third area of operation 428. The store 400 also includes a first non-commercial area 402 in the middle of the store 400 and a second non-commercial area 404 at the rear of the store 400, such as where restrooms, a kitchen, or inventory storage might be located. In this illustration, customers can buy books in the bookstore 414, drinks in the bar 416, and food or drink in the restaurant 418.

A first POS device 434 is located in the first area of operation 424 for the bookstore 414. The merchant may have used an AR recording device in the first area of operation 424 to generate AR map data having one or more environmental anchors and one or more virtual object reference points. The AR map data of the first area of operation 424 may allow the first POS device 434 to localize itself in the first area of operation 424. The merchant may have input operational parameters to the authentication server, such as through a user interface of a computing device, for the first area of operation 424. For example, the first area of operation 424 may be designated as allowing operations for merchant personnel log-in and transactions for the sale of books and merchandise, but not permitting the sale of food or drink.

If a user of the first POS device 434 attempts to transact for a book sale, the first POS device 434 may communicate with the authentication server a request for a transaction to purchase the book. The authentication server may then communicate at least a portion of the merchant's AR map data corresponding to the bookstore 414 to test re-localization of the first POS device 434. Since the first POS device 434 is in the first area of operation 424, the first POS device 434 would be capable of re-localizing using one or more of the environmental anchors and/or virtual object reference points. Successful re-localization in the first area of operation 424 would permit authentication of the first POS device's 434 request to complete a book sale transaction. Alternatively, the first POS device 434 may request AR map data for the entire store 400 and attempt to determine where the first POS device 434 is. The first POS device 434 could successfully localize in the first area of operation 424, and thereafter be permitted to complete all valid operations that were input by the merchant for the bookstore 414.

If a user of the first POS device 434 attempts to transact for a food sale, the first POS device 434 may communicate with the authentication server a request for a transaction to purchase food. The authentication server may then communicate at least a portion of the merchant's AR map data corresponding to the restaurant 418 to test re-localization of the first POS device 434. Since the first POS device 434 is in the first area of operation 424, the first POS device 434 would fail re-localization to the restaurant 418 using one or more of the environmental anchors and/or virtual object reference points. Failed re-localization in the third area of operation 428 would deny authentication of the first POS device's 434 request to complete a food sale transaction.

Alternatively, the first POS device 434 may request AR map data for the entire store 400 and attempt to determine where the first POS device 434 is. The first POS device 434 could successfully localize in the first area of operation 424, and thereafter be denied from completing any operations that were not authorized by the merchant for the bookstore 414.

If a user of the first POS device 434 attempts to transact for a drink sale, the first POS device 434 may communicate with the authentication server a request for a transaction to purchase a drink. The authentication server may then communicate at least a portion of the merchant's AR map data corresponding to the restaurant 418 and/or the bar 416 to test re-localization of the first POS device 434. Since the first POS device 434 is in the first area of operation 424, the first POS device 434 would fail re-localization to the restaurant 416 or the bar 418 using one or more of the environmental anchors and/or virtual object reference points. Failed re-localization in the second area of operation 426 or third area of operation 428 would deny authentication of the first POS device's 434 request to complete a food sale transaction. Alternatively, the first POS device 434 may request AR map data for the entire store 400 and attempt to determine where the first POS device 434 is. The first POS device 434 could successfully localize in the first area of operation 424, and thereafter be denied from completing any operations that were not authorized by the merchant for the bookstore 414.

With continued reference to FIG. 4, and in further non-limiting embodiments or aspects, a second POS device 436 is depicted in the second area of operation 426 for the bar 416. The merchant may have used an AR recording device in the second area of operation 426 to generate AR map data having one or more environmental anchors and one or more virtual object reference points. The AR map data of the second area of operation 426 may allow the second POS device 436 to localize itself in the second area of operation 426. The merchant may have input operational parameters to the authentication server, such as through a user interface of a computing device, for the second area of operation 426. For example, the second area of operation 426 may be designated as allowing operations for merchant personnel log-in and transactions for the sale of drinks, but not permitting the sale of food or books.

If a user of the second POS device 436 attempts to transact for a drink sale, the second POS device 436 may communicate with the authentication server a request for a transaction to purchase the drink. The authentication server may then communicate at least a portion of the merchant's AR map data corresponding to the bar 416 and/or the restaurant 418 to test re-localization of the second POS device 436. Since the second POS device 436 is in the second area of operation 426, the second POS device 436 would be capable of re-localizing in the bar 416 using one or more of the environmental anchors and/or virtual object reference points. Successful re-localization in the second area of operation 426 would permit authentication of the second POS device's 436 request to complete a drink sale transaction. Alternatively, the second POS device 436 may request AR map data for the entire store 400 and attempt to determine where the second POS device 436 is. The second POS device 436 could successfully localize in the second area of operation 426, and thereafter be permitted to complete all valid operations that were input by the merchant for the bar 416.

If a user of the second POS device 436 attempts to transact for a food sale, the second POS device 436 may communicate with the authentication server a request for a transaction to purchase food. The authentication server may then communicate at least a portion of the merchant's AR map data corresponding to the restaurant 418 to test re-localization of the second POS device 436. Since the second POS device 436 is in the second area of operation 426, the second POS device 436 would fail re-localization to the restaurant 418 using one or more of the environmental anchors and/or virtual object reference points. Failed re-localization in the third area of operation 428 would deny authentication of the second POS device's 436 request to complete a food sale transaction. Alternatively, the second POS device 436 may request AR map data for the entire store 400 and attempt to determine where the second POS device 436 is. The second POS device 436 could successfully localize in the second area of operation 426, and thereafter be denied from completing any operations that were not authorized by the merchant for the bar 416.

With further reference to FIG. 4, and in further non-limiting embodiments or aspects, a third POS device 438 is depicted in the third area of operation 428 for the restaurant 418. The merchant may have used an AR recording device in the third area of operation 428 to generate AR map data having one or more environmental anchors and one or more virtual object reference points. The AR map data of the third area of operation 428 may allow the third POS device 438 to localize itself in the third area of operation 428. The merchant may have input operational parameters to the authentication server, such as through a user interface of a computing device, for the third area of operation 428. For example, the third area of operation 428 may be designated as allowing operations for merchant personnel log-in and transactions for the sale of food and drinks, but not permitting the sale of books.

If a user of the third POS device 438 attempts to transact for a drink sale, the third POS device 438 may communicate with the authentication server a request for a transaction to purchase the drink. The authentication server may then communicate at least a portion of the merchant's AR map data corresponding to the restaurant 418 and/or the bar 416 to test re-localization of the third POS device 438. Since the third POS device 438 is in the third area of operation 428, the third POS device 438 would be capable of re-localizing in the restaurant 418 using one or more of the environmental anchors and/or virtual object reference points. Successful re-localization in the third area of operation 428 would permit authentication of the third POS device's 438 request to complete a drink sale transaction. Alternatively, the third POS device 438 may request AR map data for the entire store 400 and attempt to determine where the third POS device 438 is. The third POS device 438 could successfully localize in the third area of operation 428, and thereafter be permitted to complete all valid operations that were input by the merchant for the restaurant 418.

If a user of the third POS device 438 attempts to purchase a book, the third POS device 438 may communicate with the authentication server a request for a transaction to purchase the book. The authentication server may then communicate at least a portion of the merchant's AR map data corresponding to the bookstore 414 to test re-localization of the third POS device 438. Since the third POS device 438 is in the third area of operation 428, the third POS device 438 would fail re-localization to the bookstore 414 using one or more of the environmental anchors and/or virtual object reference points. Failed re-localization in the first area of operation 424 would deny authentication of the third POS device's 438 request to complete a book sale transaction. Alternatively, the third POS device 438 may request AR map data for the entire store 400 and attempt to determine where the third POS device 438 is. The third POS device 438 could successfully localize in the third area of operation 428, and thereafter be denied from completing any operations that were not authorized by the merchant for the restaurant 418.

It will be appreciated that the authorized areas of operation 424, 426, 428 may each be associated with one authorized POS device 434, 436, 438. Alternatively, a POS device 434, 436, 438 may be authorized to operate in one or more areas of operation 424, 426, 428 and may complete different operations merely by relocating and re-localizing in a respective authorized area of operation 424, 426, 428.

With further reference to the foregoing figures, the POS device 106 may have at least one processor and a computer readable medium for operating a native application that has functionality variably restricted based on merchant-defined areas of operation 108. The merchant may restrict the POS application's usage to a physical space before or after potential device theft. First, the POS application may be initialized on the POS device 106. The POS application may require an initial login as a first level of security and data tracking. If at any point the user 102 of the POS device 106 attempts to access a restricted feature or a session times out, the POS application may determine if AR world tracking fraud detection is enabled. If it is not, the POS application may use an alternative authentication mechanism, e.g., prompting a passcode input, scanning a fingerprint, scanning a keycard, and/or the like. If AR world tracking fraud detection is enabled, the POS application may perform a world re-localization process. If re-localization is not a success, the POS application may continue attempting re-localization until success or the user 102 aborts. If re-localization is a success, the POS application may permit user 102 access to restricted POS application features, or otherwise continue a session of use.

World tracking, also referred to herein as AR map recording, may use the motion data of an AR recording device's 104 accelerometer and/or gyroscope to compute changes in orientation and translation at a high frequency. The AR recording device 104 may also provide AR map data in an appropriate scale (e.g., meters). World tracking tracks various data types that may be used by a POS device or other computing device to re-localize, including, but not limited to, a map of three-dimensional feature points, local scene data, horizontal/vertical plane information which may contain the geometry of the plane surface (e.g., environmental anchors), and virtual object reference points.

The process of acquiring local map data may begin by initiating an AR recording session on an AR recording device 104. The AR recording device 104 may also be the same device as the POS device 106 which is used for re-localization and completing transactions. The AR recording device 104 may identify some of the point of view (POV) in the local environment. The POV is the place in which the user 102 creates a unique physical world by adding virtual objects to create AR map data (e.g., world map data), which may be used for authentication during re-localization. The AR recording device 104 may then initiate a world tracking process. The user 102 may start creating an imaginary (e.g., augmented) world by adding virtual objects of their choosing. Data of the virtual object reference points may be stored as anchors (e.g., reference points in the world coordinate system) in the AR database 112. Information related to planes (e.g., environmental anchors) may be stored during this process. The user 102 may continue the world tracking process with the AR recording device 104 by recording data at different angles to generate accurate world mapping data, which is useful for accurate re-localization.

The AR recording device 104 may determine if more POV data is required for the generation of AR map data. If more is required, the AR recording device 104 may prompt the user to continue recording POV data of different angles and perspectives. If sufficient AR map data has been generated, the AR recording device 104 or an authentication server 110 may determine if the AR map data is of sufficient quality (e.g., able to be used for re-localization). If the AR map data is of insufficient quality, the AR recording device 104 may continue to generate, or regenerate, the AR map data. If the AR map data is of sufficient quality, the AR map data may be stored as a map object in the AR database 112.

Re-localization may be more likely to succeed if the user 102 moves to areas of the local environment that were visited during archiving of the AR map data (e.g., tracked world map). The re-localization process may begin by the authentication server fetching the AR map data (e.g., world map object) from the AR database 112. The POS device 106 may initiate an AR session using at least part of the AR map data that was fetched. The POS device 106 may attempt re-localization with the loaded AR map data by pointing the POS device 106, and in particular a camera thereof, towards one of the POV in the physical world. Concurrently, an AR application onboard the POS device 106 may match the three-dimensional feature points of the local scene and correlate physical features with stored AR map data. In a scenario of fraudulent use away from the merchant's store, the user 102 would be unable to replicate the exact scene that is used for re-localization. In the case of failed re-localization, the POS device 106 may prompt the user 102 to try again or may abort the AR re-localization process, potentially denying one or more actions. In the case of successful re-localization, the user 102 may be granted access to restricted features, be permitted to complete a transaction, be allowed to extend the session of use, and/or the like.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
receiving, with at least one processor of a transaction service provider system, augmented reality (AR) map data associated with a merchant, the AR map data generated from at least one AR recording device and comprising at least one environmental anchor and at least one virtual object reference point, wherein the AR map data comprises a first portion associated with a first authorized area of operation and a second portion associated with a second authorized area of operation;
storing, with the at least one processor of the transaction service provider system, the AR map data associated with a merchant identifier;
storing, with the at least one processor of the transaction service provider system, operational parameters in association with the first authorized area of operation and the second authorized area of operation, wherein the operational parameters associated with the first authorized area of operation permit a type of transaction and the operational parameters associated with the second authorized area of operation prohibits the type of transaction;

receiving, with the at least one processor of the transaction service provider system, a request for authentication of at least one operation of at least one merchant point-of-sale (POS) device, the request comprising the merchant identifier, wherein the at least one operation comprises an authorization request for a transaction to be completed by the merchant POS device and to be processed by the transaction service provider system;

retrieving, with the at least one processor of the transaction service provider system, based on a current position of the at least one merchant POS device, at least one of the first portion or the second portion of the AR map data corresponding to a location in at least one of the first authorized area of operation or the second authorized area of operation;

transmitting, with the at least one processor of the transaction service provider system, at least one of the first portion or the second portion of the AR map data to the at least one merchant POS device, wherein receipt of at least one of the first portion or the second portion of the AR map data by the at least one merchant POS device causes the at least one merchant POS device to execute an AR re-localization process based on at least one of the first portion or the second portion of the AR map data; and in response to completion of the AR re-localization process by the at least one merchant POS device, and based on the operational parameters, authenticating, with the at least one processor of the transaction service provider system, the at least one operation.

2. The method of claim 1, wherein authenticating the at least one operation further comprises authenticating, with the at least one processor of the transaction service provider system, the transaction and processing the authorization request to complete the transaction.

3. The method of claim 1, wherein the at least one operation comprises a user log-in for the merchant POS device to access additional operations of the merchant POS device.

4. The method of claim 1, wherein the AR map data comprises a plurality of environmental anchors representative of a physical space of a store of the merchant.

5. The method of claim 4, wherein the AR map data comprises a plurality of virtual object reference points input by the merchant that are used for identification by the at least one merchant POS device for the AR re-localization process.

6. The method of claim 5, wherein completion of the AR re-localization process is determined at least partially by at least one of the following: a comparison of a number of successfully identified environmental anchors, a number of successfully identified virtual object reference points, or a combination thereof, to a predetermined threshold.

7. The method of claim 1, further comprising generating, with the at least one processor of the transaction service provider system, a prompt for regeneration of the AR map data in response to determining that the AR map data does not satisfy a threshold quality of mapping data.

8. The method of claim 1, wherein the AR re-localization process is combined with, and based at least partially on, input user credentials from the at least one merchant POS device for authentication of the at least one operation.

9. The method of claim 1, wherein the AR re-localization process of the at least one merchant POS device is based on the first portion or the second portion of the AR map data based on a type of the at least one operation.

10. A system comprising a server of a transaction service provider system, the server comprising at least one processor for executing program instructions and being programmed and/or configured to:

receive augmented reality (AR) map data associated with a merchant, the AR map data generated from at least one AR recording device and comprising at least one environmental anchor and at least one virtual object reference point, wherein the AR map data comprises a first portion associated with a first authorized area of operation and a second portion associated with a second authorized area of operation;

store the AR map data associated with a merchant identifier;

store operational parameters in association with the first authorized area of operation and the second authorized area of operation, wherein the operational parameters associated with the first authorized area of operation permit a type of transaction and the operational parameters associated with the second authorized area of operation prohibits the type of transaction;

receive a request for authentication of at least one operation of at least one merchant point-of-sale (POS) device, the request comprising the merchant identifier, wherein the at least one operation comprises an authorization request for a transaction to be completed by the at least one merchant POS device and to be processed by the transaction service provider system;

retrieve, based on a current position of the at least one merchant POS device, at least one of the first portion or the second portion of the AR map data corresponding to a location in at least one of the first authorized area of operation or the second authorized area of operation;

transmit at least one of the first portion or the second portion of the AR map data to the at least one merchant POS device, wherein receipt of at least one of the first portion or the second portion of the AR map data by the at least one merchant POS device causes the at least one merchant POS device to execute an AR re-localization process based on at least one of the first portion or the second portion of the AR map data; and in response to completion of the AR re-localization process by the at least one merchant POS device, and based on the operational parameters, authenticate the at least one operation.

11. The system of claim 10, wherein the AR map data comprises a plurality of environmental anchors representative of a physical space of a store of the merchant.

12. The system of claim 11, wherein the AR map data comprises a plurality of virtual object reference points input by the merchant that are used for identification by the at least one merchant POS device for the AR re-localization process.

13. The system of claim 12, wherein completion of the AR re-localization process is determined at least partially by at least one of the following: a comparison of a number of successfully identified environmental anchors, a number of successfully identified virtual object reference points, or a combination thereof, to a predetermined threshold.

14. The system of claim 10, wherein the AR re-localization process is combined with, and based at least partially on, input user credentials from the at least one merchant POS device for authentication of the at least one operation.

15. The system of claim 10, wherein the AR re-localization process of the at least one merchant POS device is based on the first portion or the second portion of the AR map data based on a type of the at least one operation.

16. A computer program product comprising at least one non-transitory computer-readable medium including program instructions that, when executed by at least one processor of a transaction service provider system, cause the at least one processor to:
   receive augmented reality (AR) map data associated with a merchant, the AR map data generated from at least one AR recording device and comprising at least one environmental anchor and at least one virtual object reference point, wherein the AR map data comprises a first portion associated with a first authorized area of operation and a second portion associated with a second authorized area of operation;
   store the AR map data associated with a merchant identifier;
   store operational parameters in association with the first authorized area of operation and the second authorized area of operation, wherein the operational parameters associated with the first authorized area of operation permit a type of transaction and the operational parameters associated with the second authorized area of operation prohibits the type of transaction;
   receive a request for authentication of at least one operation of at least one merchant point-of-sale (POS) device, the request comprising the merchant identifier, wherein the at least one operation comprises an authorization request for a transaction to be completed by the at least one merchant POS device and to be processed by the transaction service provider system
   retrieve, based on a current position of the at least one merchant POS device, at least one of the first portion or the second portion of the AR map data corresponding to a location in at least one of the first authorized area of operation or the second authorized area of operation;
   transmit at least one of the first portion or the second portion of the AR map data to the at least one merchant POS device, wherein receipt of at least one of the first portion or the second portion of the AR map data by the at least one merchant POS device causes the at least one merchant POS device to execute an AR re-localization process based on at least one of the first portion or the second portion of the AR map data; and
   in response to completion of the AR re-localization process by the at least one merchant POS device, and based on the operational parameters, authenticate the at least one operation.

17. The computer program product of claim 16, wherein the AR map data comprises a plurality of environmental anchors representative of a physical space of a store of the merchant.

18. The computer program product of claim 17, wherein the AR map data comprises a plurality of virtual object reference points input by the merchant that are used for identification by the at least one merchant POS device for the AR re-localization process.

19. The computer program product of claim 18, wherein completion of the AR re-localization process is determined at least partially by at least one of the following: a comparison of a number of successfully identified environmental anchors, a number of successfully identified virtual object reference points, or a combination thereof, to a predetermined threshold.

20. The computer program product of claim 16, wherein the AR re-localization process of the at least one merchant POS device is based on the first portion or the second portion of the AR map data based on a type of the at least one operation.

* * * * *